April 8, 1930. G. GROEBLI 1,753,430
SHOCK ABSORBER
Filed April 14, 1928
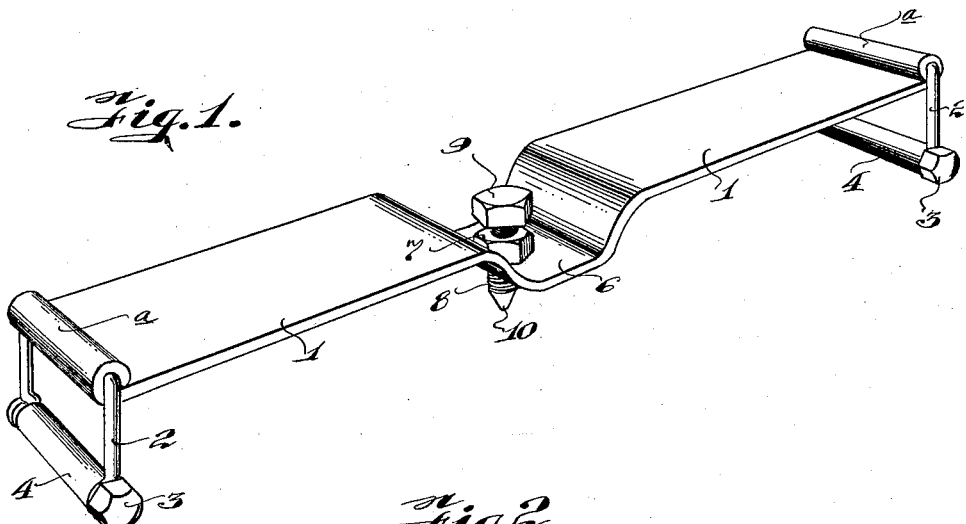
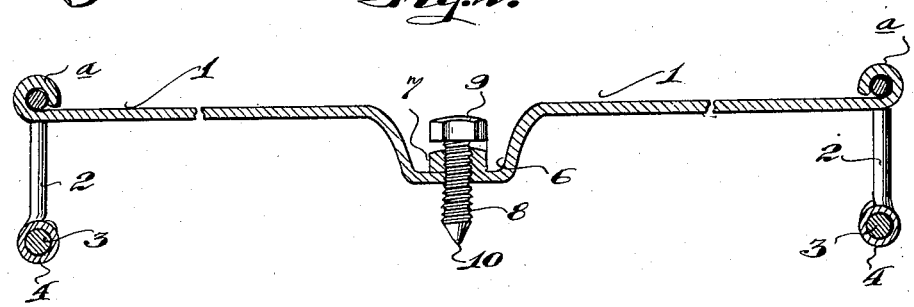
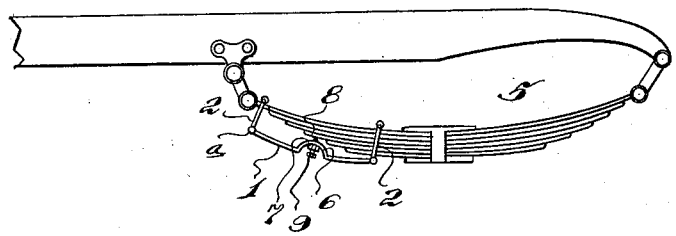
George Groebli
INVENTOR
BY Ernest A. Hood
ATTORNEY Patented Apr. 8, 1930

1,753,430

UNITED STATES PATENT OFFICE

GEORGE GROEBLI, OF DALLAS, TEXAS

SHOCK ABSORBER

Application filed April 14, 1928. Serial No. 270,053.

This invention relates to certain new and useful improvements in devices for attachment to vehicle springs to alleviate the shock created by rebound of the springs and it refers more particularly to such a device as specified having for its principal object the provision of means to effect its ready attachment to a vehicle spring in such a manner as to reinforce the spring and distribute its resiliency uniformly throughout its full length, thus to enable the same to withstand severe jolts without the attendant rocking motion when driving the vehicle over irregular ground.

The invention further aims among its objects, the provision of a device as specified, having facilities to effect its proper adjustment on the spring to obtain the maximum effect thereof in bringing about greater riding comfort and in generally improving upon the function of the conventional vehicle spring whether used upon commercial or pleasure vehicles.

Still further, the invention comprehends the provision of a device acting in the capacity of a shock absorber for vehicle springs in which there is little or no frictional contact with the spring to cause annoying noises when not lubricated and one which is not likely to become inoperative through lack of attention.

Yet another object of the invention resides in its apparent simplicity and consequent economy and its capability of attachment to any spring with little effort without requiring any alteration of the spring or relative parts whatsoever.

With the foregoing objects as paramount, the invention has particular reference to its salient features of construction and novel manner of attachment and adjustment which will become manifest as the description proceeds, taken in connection with the accompanying drawings, wherein:

Figure 1 represents a perspective view of a device constructed according to the present invention.

Figure 2 is a sectional view taken longitudinally through the middle of the device shown in Figure 1, and Figure 3 illustrates the invention applied in one form.

Continuing now more in detail with the drawings, 1 designates a strip of resilient metal of suitable temper, preferably spring steel, the ends $a$ of which are looped in the manner shown about the U shaped clamp members 2. The free ends of these members are likewise looped and through which is passed bolts 3, the latter having mounted thereon sleeves 4 capable of free rotation thereon.

Since the sleeves 4 are adapted to bear upon the vehicle spring 5, as shown in Figure 3, it is desirable that they be capable of unrestricted rotation about the bolts 3, thus to relieve any friction upon the spring thus to reduce probability of annoying squeaks resulting from such frictional contact of the metals.

Intermediate the ends of the strip 1 is an indenture 6, having either welded therein or forming integral part thereof, a nut or interiorly threaded boss 7. Through this boss is passed a screw 8, having a head 9 and a comparatively sharp end 10. Obviously, when either end of the strip 1 is securely bound to the spring 5 in the manner shown in Figure 3, the point 10 of the screw 8 will slightly penetrate the metal of one of the spring leaves, or will sufficiently indent the same as to prevent slippage, and further rotation of the screw will increase the tension upon the spring at its weakest or most resilient point.

It is probable that one or two of the devices embodying the invention will be required upon each of the usually four springs of a vehicle, and through the novel adjusting facilities described, each spring may be so tensioned as to be equal precisely in resiliency and capability of withstanding excessive jolts as the other, thus bringing about more riding comfort, positively devoid of rocking and jolts as a result of uncontrolled rebound of the springs, and eliminates so called "kangarooing" of the springs in passing over irregular ground.

In applying the invention it is required only to remove the bolts 3, place the strip along the upper or lower surface of the spring 5, but preferably the underside as shown in Figure 3, permitting the members 2 to straddle the spring. The bolts 3 and sleeves 4 are replaced and the set screw 8 adjusted to suit the requirements as to tension of the respective springs upon which the device is applied.

It will be observed that the members 2 will move in accordance with the relative movements of the leaves of the springs, and this together with the non-frictional contact of the sleeves 4 with the springs, will prevent displacement of the device on the spring, especially since the screw 8, due to the point 10, is capable of setting itself into the leaf against which it contacts.

Manifestly, the construction shown and described is capable of some modification and such modification as is considered in keeping with the appended claims is also considered within the spirit of the invention.

What is claimed is:

1. A vehicle spring attachment including a metal strip having a U-shaped central bend and having its ends rolled to form eyes, a pair of U-shaped members having their closed ends received in said eyes, and having their free ends formed with eyes, sleeves between the last named eyes, bolts passed through the last named eyes, said sleeves being formed to engage one of the horizontal faces of a vehicle spring, and a screw threaded through said U-shaped bend and engageable with the opposite horizontal face of the spring and having its head located at the open end of the U-shaped bend.

2. A vehicle spring attachment including a metal strip having a U-shaped central bend, clamp members connected to the ends of the strip and engageable with one of the horizontal faces of a vehicle spring, and a screw threaded through said U-shaped bend and engageable with the opposite horizontal face of the spring and having its head located at the open end of the U-shaped bend.

In testimony whereof I affix my signature.

GEORGE GROEBLI.